United States Patent

Mann

[11] Patent Number: 6,138,373
[45] Date of Patent: *Oct. 31, 2000

[54] DIRECT READING INSIDE AND OUTSIDE TAPE MEASURE

[76] Inventor: Harold J. Mann, P.O. Box 1605, Galveston, Tex. 77553

[*] Notice: This patent is subject to a terminal disclaimer.

[21] Appl. No.: 09/129,289

[22] Filed: Aug. 5, 1998

Related U.S. Application Data

[63] Continuation-in-part of application No. 08/641,540, May 1, 1996, Pat. No. 5,832,622.

[51] Int. Cl.[7] .............................. G01B 3/10; B65H 75/48
[52] U.S. Cl. ............................... 33/766; 33/767; 33/761; 242/381
[58] Field of Search ........................... 33/766, 755, 761, 33/767; 242/381, 381.1–381.6

[56] References Cited

U.S. PATENT DOCUMENTS

| | | | |
|---|---|---|---|
| 4,449,302 | 5/1984 | Drechsler et al. | 33/767 |
| 4,649,649 | 3/1987 | Fain | 33/761 |
| 4,663,854 | 5/1987 | Miller et al. | 33/767 |
| 5,395,069 | 3/1995 | Chen | 33/767 |
| 5,624,085 | 4/1997 | Usami | 33/767 |
| 5,657,551 | 8/1997 | Lin | 33/767 |
| 5,832,622 | 11/1998 | Mann | 33/766 |

*Primary Examiner*—Christopher W. Fulton
*Attorney, Agent, or Firm*—William S. Ramsey

[57] ABSTRACT

An improved measuring tape which allows both inside and outside dimensions to be read directly from the same printed face of the tape. The tape measure comprises a case having a tape coiled inside the case and extending out of the case through a slot in the case. Inside the case is a guide wheel which guides the tape along a bottom wall of the case. The front wall of the case is transparent so that the graduations on the tape can be seen adjacent to the bottom wall. A pointer on the case points to the graduations such that when the tape is fully retracted, the pointer points to a measurement corresponding to the width if the case. This enables the case and the tape to be used to make inside measurements. Another embodiment includes a lock which secures the tape at any extended position, and a brake which slows the tape on retraction and prevents damage to the tape or to the end hook.

8 Claims, 4 Drawing Sheets

DIRECT READING INSIDE AND OUTSIDE TAPE MEASURE

This application is a continuation-in-part of application Ser. No. 08/641,540, filed May 1, 1996, now U.S. Pat. No. 5,832,622.

BACKGROUND OF THE INVENTION

1. Field of Invention

This invention relates to spring-loaded coil in case tape measures, specifically to those providing inside as well as outside dimensions.

2. Description of the Prior Art

Carpenters and workers have had a long-standing need for a better tape measure which can measure inside as well as outside dimensions. The need is for one that will directly read the space between two facing walls as well as the dimension outside walls, which is two wall thickness' greater. This is discussed in U.S. Pat. No. 2,131,695 which was issued to A. L. Stowell in 1939. Stowell lists the inside measuring feature as a first aim. This tape is manually pressed into a storage ring, building the coil toward the center. For this reason it becomes unwieldy at lengths above three meters.

Likewise, in 1952, William F. Dart proposed an easily read tape for both inside and outside dimensions in his U.S. Pat. No. 2,695,454. Darts tape is read at recessed pointers near the tape outlet. It is not really direct reading since the user must mentally add the case width to the pointer reading to arrive at inside dimensions.

In 1966 A. N. Anderson received U.S. Pat. No. 3,255,531. This device is truly direct reading. It reads the convex face of the tape through a viewing window on top of the case for inside dimensions. One drawback is that both sides of the tape must be printed with graduations, adding an increment of cost. Also this design required complex means to control the developed length of the tape as it travels to the top viewing window.

Witchger discloses in U.S. Pat. No. 1,987,652 a tape measure with a resilient band element which envelops and snugly fits the coil of tape. The band is secured at one end to the inside of the casing and acts to dampen the action of the coil spring and provide braking action to the tape throughout its entire range of operation.

Volz discloses in U.S. Pat. No. 2,072,538 a tape measure with a number of flexible spring fingers arranged circumferentially around the inside of the casing. The free ends of these fingers bear upon the coiled tape and guide it into a coil when the tape is pushed into the casing.

Hogan et al. disclose in U.S. Pat. No. 3,816,925 a tape measure with an elongate sliding brake member which locks the tape by forcing the tape against an abutment formation with a hollow into which a part of the tape is slightly flexed when the brake is applied.

Roe discloses in U.S. Pat. No. 4,194,703 a tape measure with a lock slide which locks the tape in any extended position by forcing the tape against the casing at the mouth of the casing. The retraction of the tape may be suppressed or stopped at any time be pressing on a pivoting button which applies brake pads to the edges of the spool around which the tape is coiled.

Czerwinski et al. disclose in U.S. Pat. No. 4,578,867 a tape measurer with a rib having a relatively high coefficient of friction mounted inside the casing so that a rapidly retracting tape will contact the rib and its speed will be retarded by the friction. The position of the rib is such that the tape does not normally contact the rib on extension.

Burton discloses in U.S. Pat. No. 4,687,155 a tape measure in which the excessively fast retraction of the tape is retarded by mounting the tape on a rotating carrier which wobbles at high speed. The wobble causes contact between the carrier and posts or curved structures arranged around the inside of the casing thereby reducing the speed of the carrier.

Kang discloses in U.S. Pat. No. 4,856,726 a tape measure with a stopping device which does not contact the tape itself. The push button device locks the tape spool by engaging a number of protrusions which extend from the circumference of the spool.

SUMMARY OF THE INVENTION

In my tape measure the read point for inside dimensions is inside the case at the lower right hand corner. A mark on a wall of the case is read through a transparent front wall. The coil of tape on the reel is raised slightly and the path of tape being withdrawn in caused to arc around a detour wheel. This makes possible the easy reading of tape graduations now clearly visible through the case front.

Accordingly, several objects and advantages of the invention are to provide an improved inside and outside tape measure, to provide a more affordable design which has minimal added structure. In my design there is no need to print the reverse side of the tape. No mental arithmetic is required to know accurate inside dimensions. My improvement makes easy the reading of the smallest increment of scale from a primary concave face of the tape. Further objects and advantages will become apparent from the ensuing description and drawings.

In addition, an embodiment is disclosed with a lock mechanism which locks the tape at any extended position and a snubber brake device, which controls the speed of retraction of the tape by the spring.

Accordingly, the tape of this embodiment is capable of being locked at any desirable position to facilitate the use of the tape in making repeated measurements. The harmful effect of excessive tape retraction speed, which causes wear on the tape and sometimes causes the hook on the end of the tape to break off, is avoided by the brake device.

DESCRIPTION OF THE PREFERRED EMBODIMENTS

Figure 1:
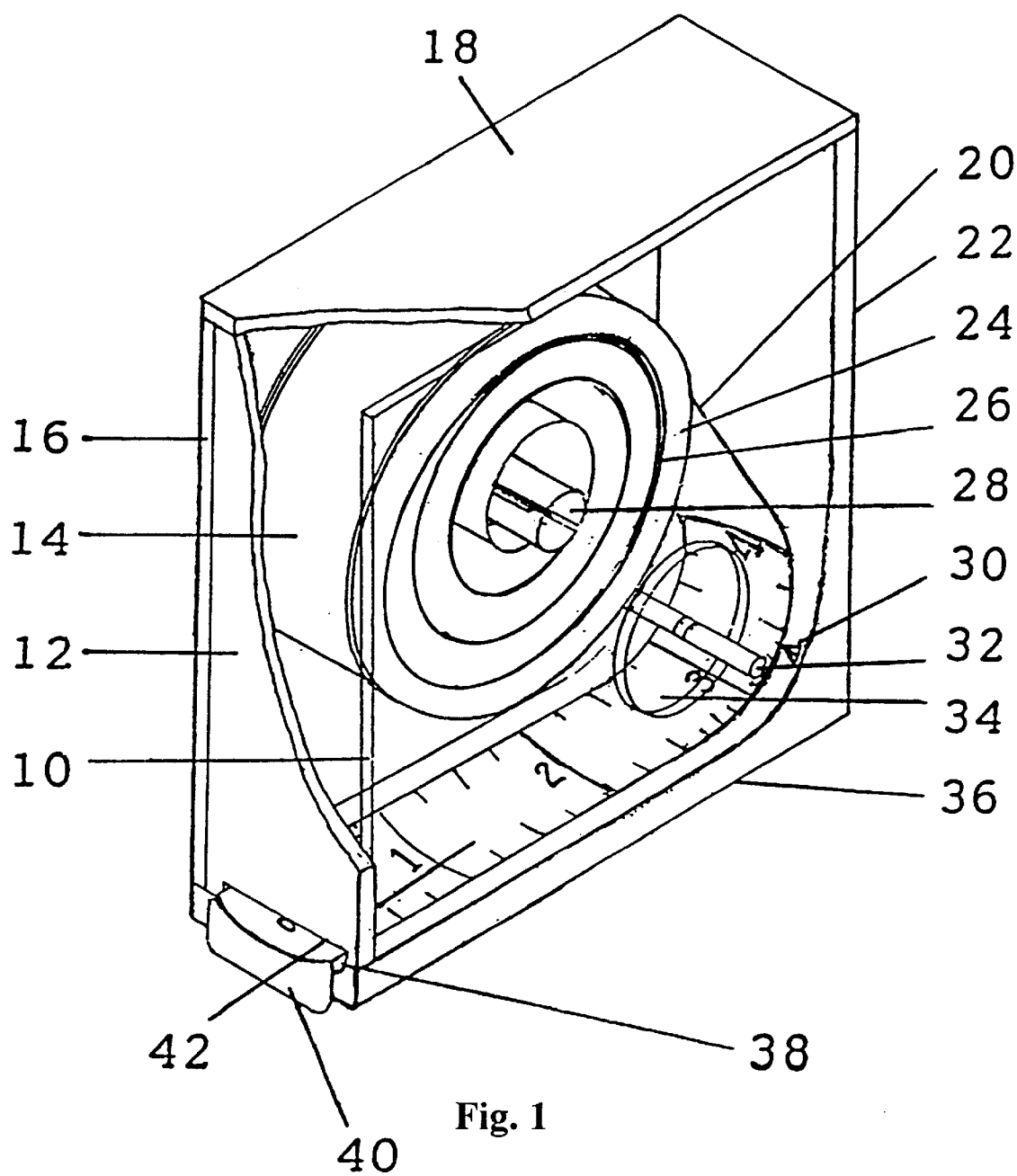
FIG. 1 shows a perspective cutaway view of a tape measure according to my invention.

My tape measure, FIG. 1, comprises a case which consist of a generally rectangular back wall 16, a matching-size transparent front wall 10, a left side wall 12, a right side wall 22, a top 18, and bottom 36. These six planar surfaces from a rectangular prism which encases this hand-held measuring tool. The convenient size should not exceed 10 cm in height and width nor more than about 4 cm in thickness. Transparent front wall 10 of the case is preferably of 2 mm thick, clear polycarbonate sheet. The rest of the case is formed of aluminum with a wall thickness of 3 mm.

The case is somewhat taller than previous designs, allowing space for new features. Left side wall 12 has an outlet 38, near case bottom 36. This outlet is 2 cm by 5 mm allowing passage for a graduated tape 20 to extend and retract. Tape 20, the essence of the tool, is of high carbon steel six meters in length, with a width of 2 cm. The tape is printed with graduations on one face starting from 90 degree flanged hook 40, which is slidably attached to an end of the tape. The opposite end is secured to the outside surface of reel 24. Reel 24 is of molded polypropylene, 5 cm in diameter with a hole bore of 6 mm. When not in use tape 20 is wound tightly around reel 24 inside the case to form a coil 14. (The tape coil on a reel is conventional at present.)

A spindle 28 protrudes into the case as an integral part of back wall 16 and perpendicular to it. Spindle 28 is 7 mm in diameter and extends 3 cm out from the back wall. The spindle has a central slot which is 1 mm wide and which extends from it's outer end 2 cm back toward back wall 16. Reel 24 pivots on the spindle. The spindle slot clamps on an end of a clock-type spring 26. This spring is mounted between the spindle and the inner wall of the reel. A section 42 of tape 20 extends from coil 14 through tape outlet 38. Hook 40 is pulled against this outlet by spring 26 when tape 20 is retracted. Several important new features are visible through the transparent front wall. In the preferred embodiment, a wheel 34 of clear acrylic material 3 cm in diameter is fixed on a shaft 32, which extends between the case walls from front to back. Shaft 32 is 3 mm in diameter located so that when turning the wheel forces tape 20 toward right side wall 22 leaving only minimum clearance of 2 mm. Wheel 34 is in rolling contact with the concave face of the tape. Spring 26 maintains a slight tension on the tape so that it holds a constant arc around the wheel. Each small graduation on the tape edge traveling on this arc passes a point near wall 22 equal to the width of the case. At this exact point a marker 30 is attached to the case on right wall 22 near the bottom. If it is desired to print graduations of an alternative system on the back wall edge of the tape opposite marker 30, another marker may be placed 90 degrees across the tape.

To use tape measure, the user pulls hook 40 withdrawing tape 20 from its coiled condition on coil 14. This turns reel 24, generating retracting power by winding clock-type spring 26 tighter. The reel pivots on spindle 28. The tape extends from the coil outward past marker 30 and wheel 34 in route to outlet 38.

In an important feature of operation, wheel 34 causes the tape to detour away from a direct straight-line path from the coil to the tape outlet. This detour path creates a viewing gap so that marker 30 can be easily seen through the transparent front wall. Marker 30 is aligned with the tape graduation mark equal to the known width of the case. In the present example, it can be seen that marker 30 points to a measurement of 3⅜ inches, the width of the case. This demonstrates that the device provides inside dimensions. The user reads an inside dimension from marker 30 when hook 40 is pressed against a leftward object and right wall 22 is pressed against a rightward object.

Figure 2:
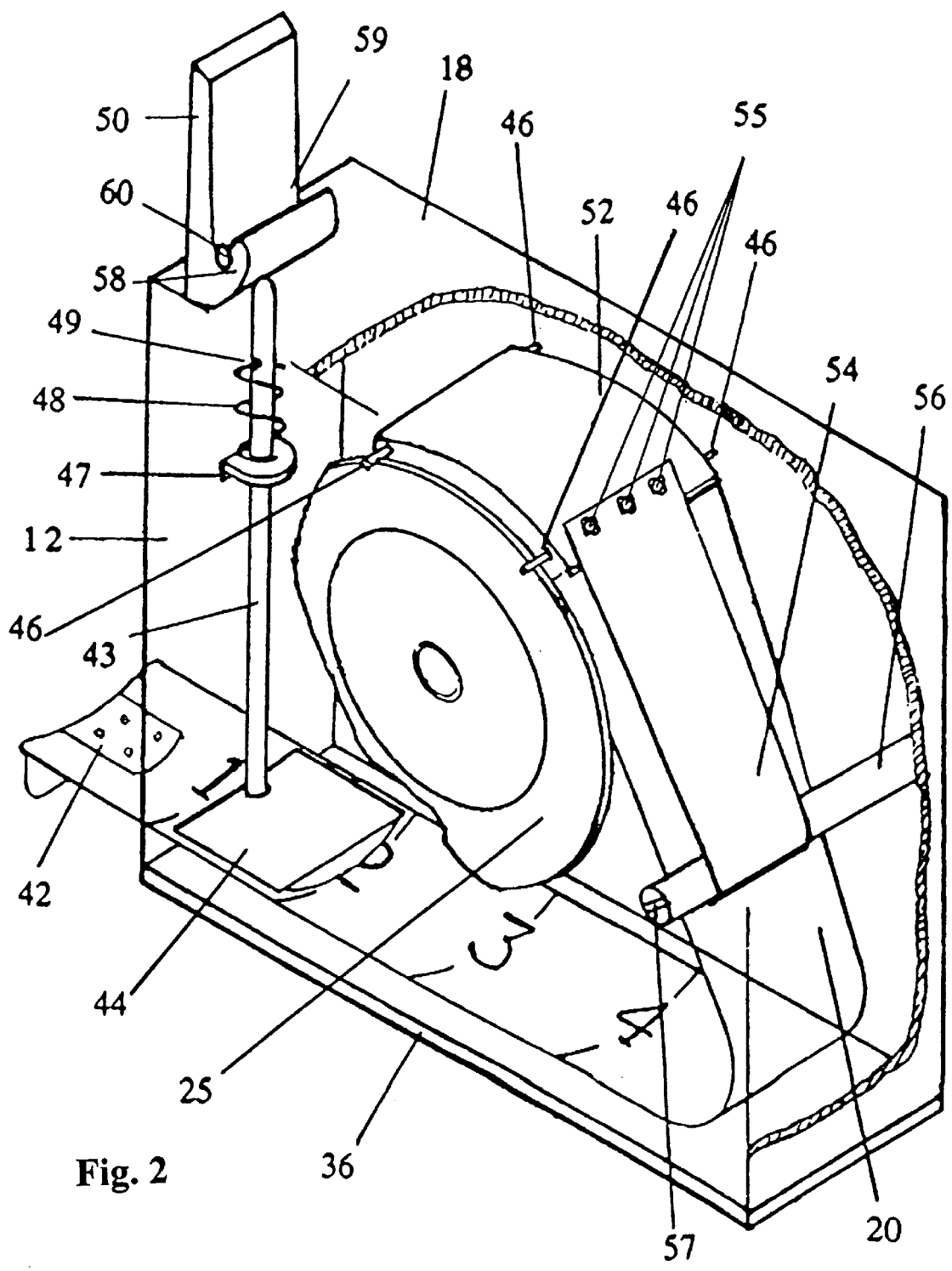
FIG. 2 shows a perspective cutaway view of a second embodiment tape measure with the lock unengaged.
Figure 3:
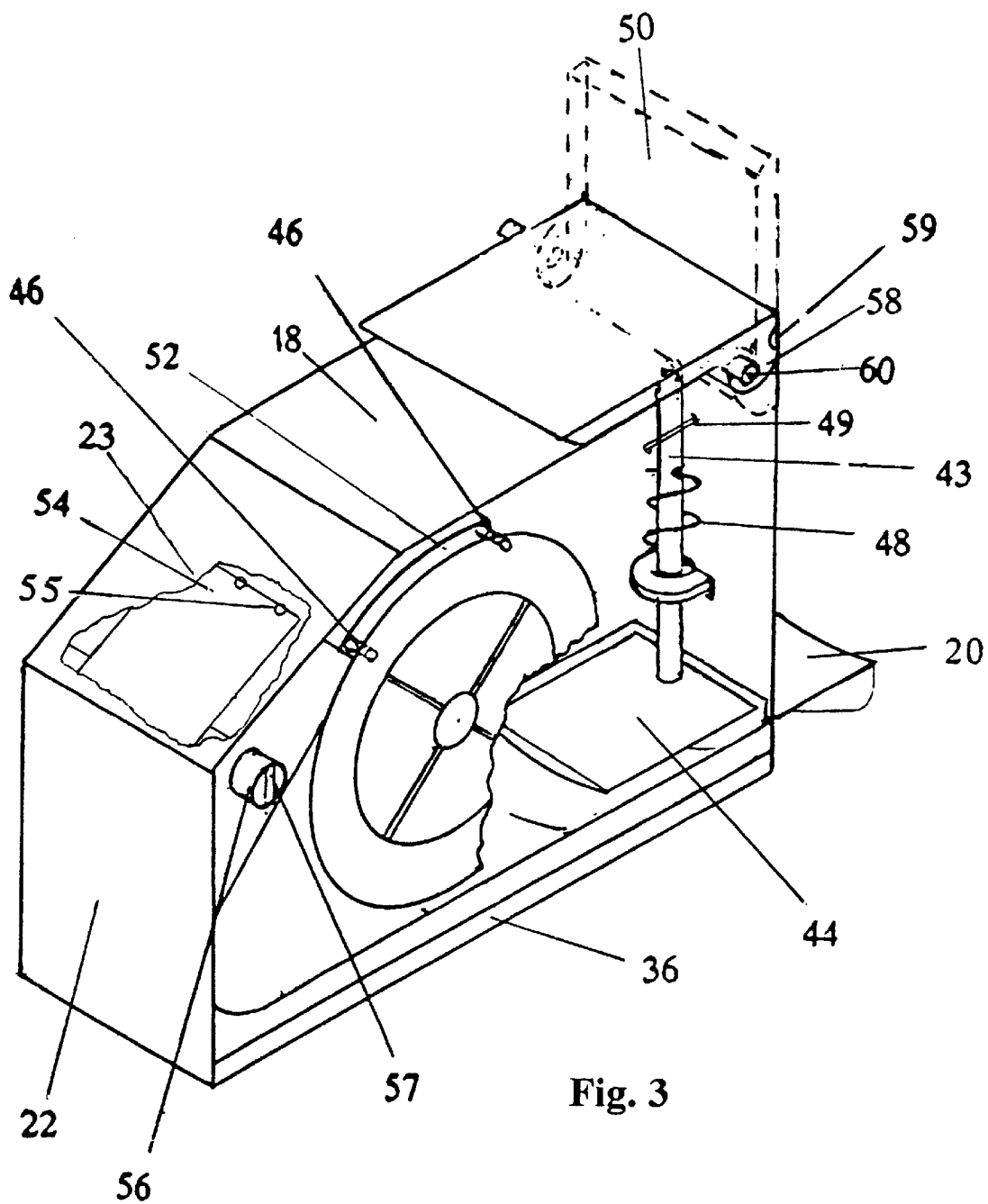
FIG. 3 shows a perspective cutaway view of the second embodiment tape measure with the lock engaged.
Figure 4:
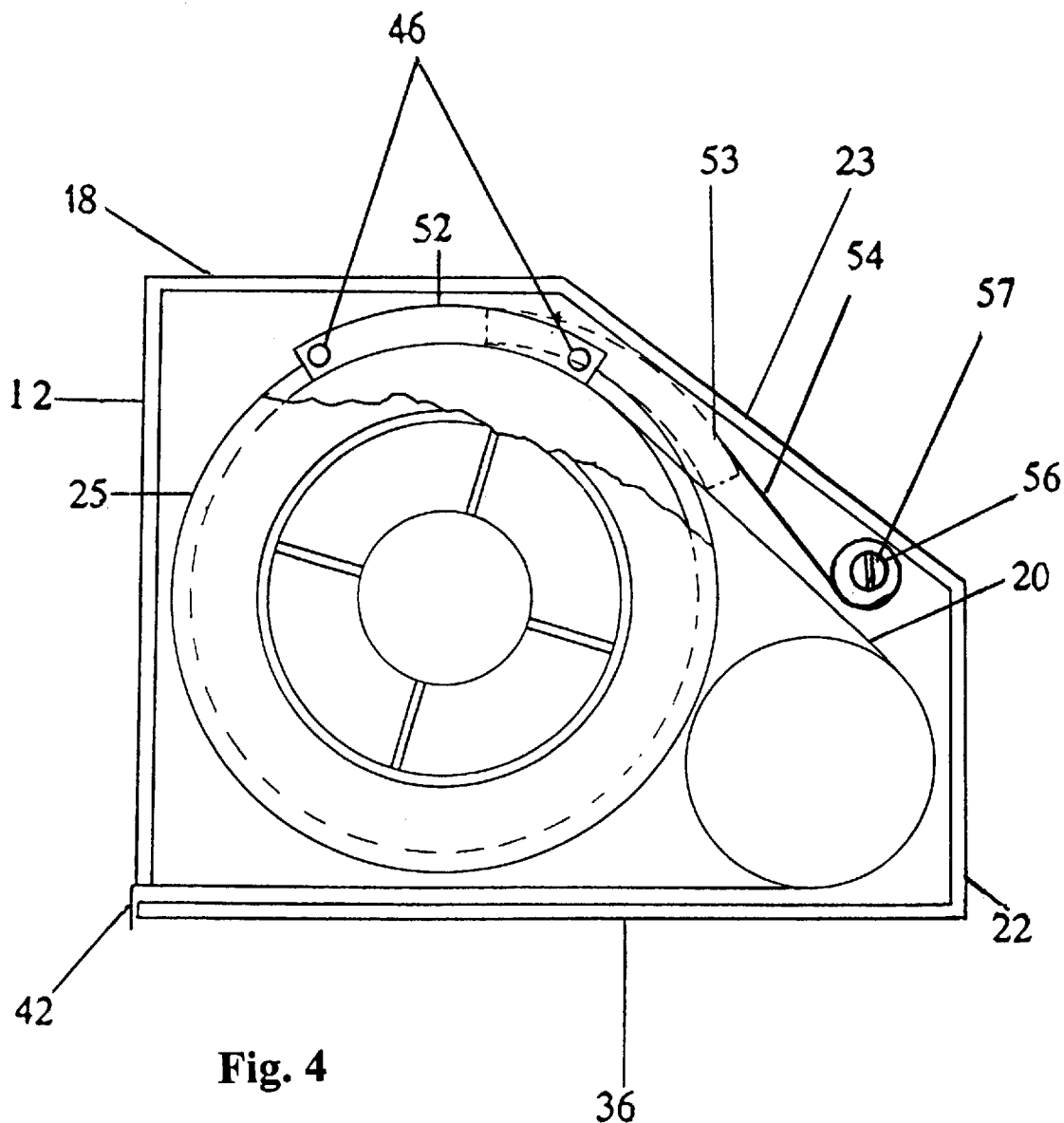
FIG. 4 shows a perspective cutaway view of the second embodiment tape measure with two possible positions of the magnetic slowing device.

There are two important new characteristics of my tape measure revealed in FIGS. 2 through 4. These are the lock for securing the tape when extended from the case, 43, 44, 47, 48, 49, 50, 58 and 60, and the arcuate snubber brake device, 46, 52, 54, 56 and 57.

The wheel 34 which holds the tape 20 and is shown in FIG. 1 is not shown in FIGS. 2 through 4.

FIG. 2 shows the tape measure with the lock engaged. The pivoting cam lever 50 is in the perpendicular position, locked. The pivoting cam lever bearing 58 swings around the pin 60 to press the lock rod 43 downward. The lock pad 44 is attached to the bottom of lock rod 43 and bears down on the tape 20 against the inside surface of the bottom of the case 36. This stops the tape 20 and the flanged hook 42 at the required distance from the left wall 12. The spring 48 is compressed between the lower spring stop 47 which is attached to the left side wall of the case 12 and the upper spring stop 49 which is attached to the lock rod 43. Spring 48 biases the lock rod 43 upward toward the top of the case 18.

A snubber 52 has pins or limiters 46 which rest on the rims of the reel 25. The snubber 52 is attached to one end of an adjuster strap 54 by rivets 55 or other fasteners. The other end of the adjuster strap 54 is attached to the adjuster axle 56. A flat head screwdriver indentation 57 is used to rotate the adjuster axle 56.

FIG. 3 contains many of the same elements as FIG. 2. FIG. 3 reveals the reverse side of the tape measure from FIG. 2. A sloping side 23 is located between the top 18 and the right side wall 22. The adjuster axle 56 is located at the corner between the sloping side 23 and the right side wall 22. The adjuster axle 56 has a flat head screwdriver indentation 57, which when rotated in a clockwise direction, indicated by the "+" sign, increases the surface area between the snubber 52 and the outer layer of the coil 14 (not shown in FIG. 3) and therefore increases the retraction time of the tape 20. The adjuster axle 56, when rotated in a counter-clockwise direction, indicated by the "−" sign near the flat head screwdriver indentation 57, pulls the snubber 52 away from the outer layer of the coil 14 which decreases the surface area between the snubber 52 and the outer layer of the coil 14 and therefore decreases the retraction time of the tape 20.

The solid lines to the pivoting cam lever 50 show the tape measure lock in the unlocked position. The dotted lines to the pivoting cam lever 50 show the tape measure lock in the locked position.

In the locked position, the pivoting cam lever 50 and the pivoting cam lever bearing 58 are swung around the pin 60 so the pivoting cam lever 50 is perpendicular to the top of the case, as in FIG. 2 and FIG. 3. When the pivoting cam lever 50 is raised, the pivoting cam lever bearing 58 forces the lock rod 43 downward, thereby causing the lock pad 44 to bear on the tape 20 and press the tape 20 against the inside surface of the bottom of the case 36, thereby securing the tape against extension or retraction. The lower surface of the lock pad 44 has the shape of a section of a cylinder.

The raising of the pivoting cam lever 50 moves the lock rod 43 against the lock spring 48. The lock spring 48 biases the lock rod 43 upward toward the top of the case. When the pivoting cam lever 50 is in the unlocked position, parallel to the top of the case, the lock spring 48 insures the lock pad 44 is not in contact with the tape 20. Lock spring 48 extends between an upper spring stop 49 attached to the lock rod 43 and the lower spring stop 48 attached to the left side wall 12. The compression force of lock spring 48 is released when the pivoting cam lever 50 extends parallel to the top of the case 18 and the top of the lock rod 43 rises to the indentation 59 between the pivoting cam lever 50 and pivoting cam lever bearing 58. In this position, the lock pad 44 no longer contacts the tape 20 and the tape 20 is able to retract into the tape measure housing.

An arcuate snubber 52 rests on the rims of the reel 25 by the limiters or pins 46. The snubber 52 is a magnet constructed of magnetic material, such as iron, steel, alloy or the like. The tape 20 is constructed of paramagnetic material, such as steel, aluminum, platinum or the like. The snubber 52 is used to restrain the speed of tape 20 retraction by coming into frictional contact with the outer coils of the tape 20 as the tape 20 is retracted into the case. The snubber 52 is also attached to an adjuster axle 56 by an adjuster strap 54. The adjuster axle 56 is rotated by a flat head screwdriver indentation 57. Rotating the adjuster axle 56 clockwise results in the shortening of the adjuster strap 54 which decreases the contact area between the snubber 52 and the tape 20, resulting in a faster retraction time. Rotating the adjuster axle 56 counter-clockwise produces a larger contact area between the snubber 52 and the tape 20 which results in a slower retraction time.

The snubber 52 may also be constructed of non-magnetic material, such as plastic. In this variation, the snubber 52 utilizes friction to slow the tape 20 when the retracted coil 14 is large enough to contact the snubber 52. Therefore, the retraction time is initially very quick and then slows as more of the tape 20 is retracted. This prevents the hook 40 from snapping off due to a fast retraction speed.

FIG. 4 provides a side view of the tape measure. Many of the same elements from the previous three figures are incorporated into this Fig. The solid lines show the snubber 52 in the slow retraction time setting, as discussed in FIG. 3. The dotted lines show the snubber 52 in the fast retraction time setting.

From the above it is apparent that my tape measure is a more convenient, accurate, and timesaving way of dimensioning in the workplace. This improvement makes unnecessary the double printing of some previous tapes. It also avoids many mistakes caused by the tedious need to mentally add two fractional numbers together. These mistakes result in the waste of material and time.

While the above description is concrete in tone, it should not be seen as limiting the scope of the invention. New material developments may suggest detail changes. Instead of one wheel to guide the tape, a plurality of smaller wheels, (not shown) or slides can be used. A series of magnetized rollers can be placed beneath the tape to assist guidance. The back wall may also be made transparent so that the device is readable from either side. Reflective surfaces inside the case as well as mirrors and magnifiers can be used under conditions of poor lighting. The materials and dimensions indicated can be changed, e.g., the case can be made of all plastic instead of part aluminum. Accordingly, the scope of the invention should be determined not by the embodiment illustrated, but by the appended claims and their legal equivalents.

I claim:

1. In a tape measure comprising a case with a reel of tape pivoted on a spindle within said case, said case having a tape outlet said tape being printed on one side with graduations and coilable and decoilable through said tape outlet, an improvement characterized in that said case has:
   (a) a wall of transparent material,
   (b) guiding means of clear material for guiding said tape so that said graduations can be read through said transparent wall,
   (c) indicating means attached to said case so that said graduations will move past said indicating means as said tape is pulled out of said case outlet,
   (d) a lock for securing the tape when extended from said case, and
   (e) a brake for restraining the speed of tape retraction.

2. In a tape measure comprising a case with a reel of tape pivoted on a spindle within said case, said case having a tape outlet said tape being printed on one side with graduations and coilable and decoilable through said tape outlet, an improvement characterized in that said case has:
   (a) a wall of transparent material,
   (b) guiding means of clear material for guiding said tape so that said graduations can be read through said transparent wall,
   (c) indicating means attached to said case so that said graduations will move past said indicating means as said tape is pulled out of said case outlet,
   (d) a lock for securing the tape when extended from said case, and
   (e) a brake for restraining the speed of tape retraction,
   wherein the lock comprises:
      a pivoting cam lever attached at the top of the case,
      a lock rod having an upper and a lower end,
      a lock spring which biases the lock rod upward toward the top of the case, and
      a lock pad attached to the lower end of the lock rod,
      the pivoting cam lever extending parallel to the top of the case in the unlocked position and extending perpendicular to the top of the case in the locked position,
      the lock spring biasing the lock rod upward toward the top of the case when the pivoting cam lever is in the unlocked position,
      the pivoting cam lever bearing against the upper end of the lock rod and forcing the lock rod downwardly, thereby causing the lock pad to bear on the tape and press the tape against the inside surface of the bottom of the case, thereby securing the tape against extension or retraction when the pivoting cam lever is in the locked position.

3. The tape measure of claim 2 wherein the pivoting cam lever is attached to the top of the case by a pin attached to the sides of the case.

4. The tape measure of claim 2 wherein the lock rod is biased upward by the lock rod spring while in the unlocked position and camed downward by the pivoting cam lever while in the locked position.

5. The tape measure of claim 2 wherein the lock pad has a lower surface which bears against the tape and which has the shape of a section of a cylinder.

6. In a tape measure comprising a case with a reel of tape pivoted on a spindle within said case, said case having a tape outlet said tape being printed on one side with graduations and coilable and decoilable through said tape outlet, an improvement characterized in that said case has:
   (a) a wall of transparent material,
   (b) guiding means of clear material for guiding said tape so that said graduations can be read through said transparent wall,
   (c) indicating means attached to said case so that said graduations will move past said indicating means as said tape is pulled out of said case outlet,
   (d) a lock for securing the tape when extended from said case, and
   (e) a brake for restraining the speed of tape retraction,
   wherein the brake comprises:
      an arcuate snubber which comes into frictional contact with the outer coils of the tape as the tape is retracted into the case for retarding the speed of retraction of the tape into the case,
      an adjuster strap attached at one end of the arcuate snubber, and
      an adjuster axle extending between the sides of the case,
      the adjuster strap attached to the adjuster axle,
      the length of the adjuster strap adjustable by rotating the adjuster axle.

7. The tape measure of claim 6 wherein the arcuate snubber has pins at each corner which rest on the rims of the reel, thereby preventing contact between the snubber and the tape until nearly all of the tape is retracted into the case.

8. The tape measure of claim 6 wherein the tape is constructed of paramagnetic material and the snubber is constructed of magnetic material.

* * * * *